(12) United States Patent
Deremiah

(10) Patent No.: US 7,429,323 B2
(45) Date of Patent: Sep. 30, 2008

(54) WATER TREATMENT SYSTEM AND PRESSURE PIPE THEREFOR

(75) Inventor: Richard E. Deremiah, Centerville, OH (US)

(73) Assignee: Price Brothers Company, Dayton, OH (US)

( * ) Notice: Subject to any disclaimer, the term of this patent is extended or adjusted under 35 U.S.C. 154(b) by 580 days.

(21) Appl. No.: 11/116,025

(22) Filed: Apr. 27, 2005

(65) Prior Publication Data

US 2006/0243649 A1    Nov. 2, 2006

(51) Int. Cl.
 *C02F 1/78* (2006.01)
 *F16L 9/08* (2006.01)

(52) U.S. Cl. .................. 210/192; 210/199; 210/254; 210/418; 138/109; 138/145; 138/155; 138/175

(58) Field of Classification Search .............. 210/198.1, 210/192, 748, 199, 254, 418; 250/432 R, 250/435; 422/24; 290/54; 138/109, 145, 138/155, 175, 176; 285/230, 231, 374
See application file for complete search history.

(56) References Cited

U.S. PATENT DOCUMENTS

| 1,346,687 | A | * | 7/1920 | Scofield | 285/288.1 |
| 2,436,683 | A | * | 2/1948 | Wood, Jr. | 290/52 |
| 2,470,009 | A | * | 5/1949 | Wilhelm | 138/145 |
| 2,808,851 | A | * | 10/1957 | James | 138/145 |
| 3,177,019 | A |  | 4/1965 | Osweiler | |
| 3,776,576 | A |  | 12/1973 | Keyser | 285/27 |
| 4,731,545 | A | * | 3/1988 | Lerner et al. | 290/54 |
| 4,899,057 | A | * | 2/1990 | Koji | 250/436 |
| 5,004,274 | A |  | 4/1991 | Baas | 285/288 |
| 6,805,791 | B2 |  | 10/2004 | Fittkau et al. | 210/101 |
| 6,854,770 | B2 | * | 2/2005 | Leblanc | 285/230 |
| 6,927,501 | B2 | * | 8/2005 | Baarman et al. | 290/43 |
| 2005/0000913 | A1 | * | 1/2005 | Betterly | 210/748 |

OTHER PUBLICATIONS

William Sleeper and David Henry for Metropolitan Water District of Southern California, *Durability Test Results of Construction and Process Materials Exposed to Liquid and Gas Phase Ozone*, Paper was presented at The International Ozone Association Pan American Group Conference, Newport Beach, CA, May 5-9, 2001.

* cited by examiner

*Primary Examiner*—Matthew O Savage
(74) *Attorney, Agent, or Firm*—Wood, Herron & Evans, LLP

(57) ABSTRACT

A pressure pipe for transporting corrosive material, such as ozonated water, is formed with a pipe joint that is resistant to ozone. An intermediate portion of the pressure pipe is formed from a low-carbon steel cylinder with inner and outer concrete layers and prestressing wire. A stainless steel slip joint member is attached to an end of the low-carbon steel cylinder to facilitate joining adjacent pipe sections. The stainless steel slip joint members resist the corrosive effects of ozone, while the inner concrete layer protects the low-carbon steel cylinders of the intermediate portion. In one aspect of the invention, a water treatment system constructed from pressure pipe as described above is connected as a bypass loop to a primary pipe run from a water source to a treatment plant. Ozone is introduced to water diverted through the bypass loop. The water decomposes prior to being reintroduced back into the primary pipe run.

14 Claims, 4 Drawing Sheets

WATER TREATMENT SYSTEM AND PRESSURE PIPE THEREFOR

FIELD OF THE INVENTION

The present invention pertains to piping systems, and more particularly to a piping system suitable for use in transporting corrosive fluids such as ozonated water.

BACKGROUND OF THE INVENTION

Piping systems are commonly used to transport water, sewage, and similar fluids. When the fluid is transported under pressure, specialized pressure pipe is used which is configured to withstand the internal pressure of the fluid and the thrust forces generated by movement of the fluid through the piping system. Conventional pressure pipe is constructed using low-carbon steel cylinders that have inner and outer concrete layers and which are wound by pre-stressing steel wires, as described in U.S. Pat. Nos. 3,177,019; 3,776,576; and 5,004,274, each assigned to the Assignee of the present invention and hereby incorporated by reference in their entirety. Each of these patents further discloses restrained slip joints wherein a steel locking ring provided at one end of a first pipe section may be contracted to engage a corresponding recess provided at the end of an adjacent pipe section. This type of pipe joint has particular advantages that facilitate quick and efficient assembly of the joint restraining mechanism.

A known method of treating raw water from a source, such as a lake or reservoir, to kill viruses, bacteria, and other organic material that may be in the water, is to subject the raw water to ozone. Conventionally, ozone is bubbled through the water to be treated, or the treated water is exposed to high voltage electric discharge to create the ozone. The water may also be mixed with a solution containing a high concentration of ozone. Due to the highly unstable nature of ozone, it gradually decomposes out of the treated water, whereafter the treated water is suitable for drinking and other sanitary uses. The properties that make ozone useful for treating raw water, however, also make it highly corrosive. Accordingly, special equipment is required for the treatment and handling of ozonated water.

The treatment of water with ozone is conventionally done at a water treatment plant which services a distribution network that in turn delivers sanitized water to residential or commercial customers. Accordingly, the treatment plant must be outfitted with special equipment to ozonate the water, and holding tanks for permitting the ozone to decompose, thereby limiting the output capacity of the plant. Conventional ozonation systems have been constructed using stainless steel pipes and tanks. While stainless steel is resistant to the corrosive effects of ozone, it is quite expensive.

A need therefore exists for a cost effective treatment system which is resistant to the corrosive effects of ozone in the water and increases the throughput of treated water at the plant.

SUMMARY OF THE INVENTION

The present invention provides a system for treating raw water with ozone and which can be incorporated into a primary piping run from a source of raw water to a treatment plant. The system is formed from pressure pipe that has been specially constructed to resist the corrosive effects of ozone, while limiting the need for extensive lengths of stainless steel pipe. In one aspect of the invention, raw water is diverted from the primary piping run and into a bypass loop constructed from the special pressure pipe. Ozone is added to the raw water to kill viruses, bacteria, and other organic material in the water. The water continues along the bypass loop while the ozone naturally decomposes before being reintroduced back into the primary piping run and on to the treatment plant. Because the water is ozonated before reaching the plant, the water arriving at the plant is in better condition for further treatment at the plant. The need for special equipment and holding tanks at the plant is eliminated, thereby reducing cost and increasing throughput at the plant.

In another aspect of the invention, pressure pipe for use in transporting corrosive material, such as ozonated water, includes an intermediate pipe portion that is constructed in the same manner as conventional pressure pipe. The intermediate portion has a low-carbon steel cylinder that is coated with concrete on its inner and outer surfaces. The intermediate portion may further include prestressing wires wound around the cylinder or the concrete layers. A stainless steel slip joint member is attached to one end of the low carbon steel cylinder, such as by welding. This stainless steel slip joint may be provided in the form of a bell ring or a spigot ring, similar to those found in conventional pressure pipe. While the slip joint members are susceptible to direct exposure to ozone, the stainless steel material resists the corrosive effects of the ozone. The low-carbon steel forming the intermediate portions of the pressure pipe is protected by the inner concrete layer. To this end, the thickness of the inner concrete layer is carefully controlled to ensure that adequate protection is provided.

In another aspect of the invention, first and second pipe members, constructed as described above, are joined together in an end-to-end arrangement by inserting a spigot ring provided on the first pipe member into a bell ring provided on the second pipe member. An interface between the spigot and bell rings is welded to provide a water-tight joint. Several pipe members may be joined in the same manner to form the bypass loop of the treatment system described above.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
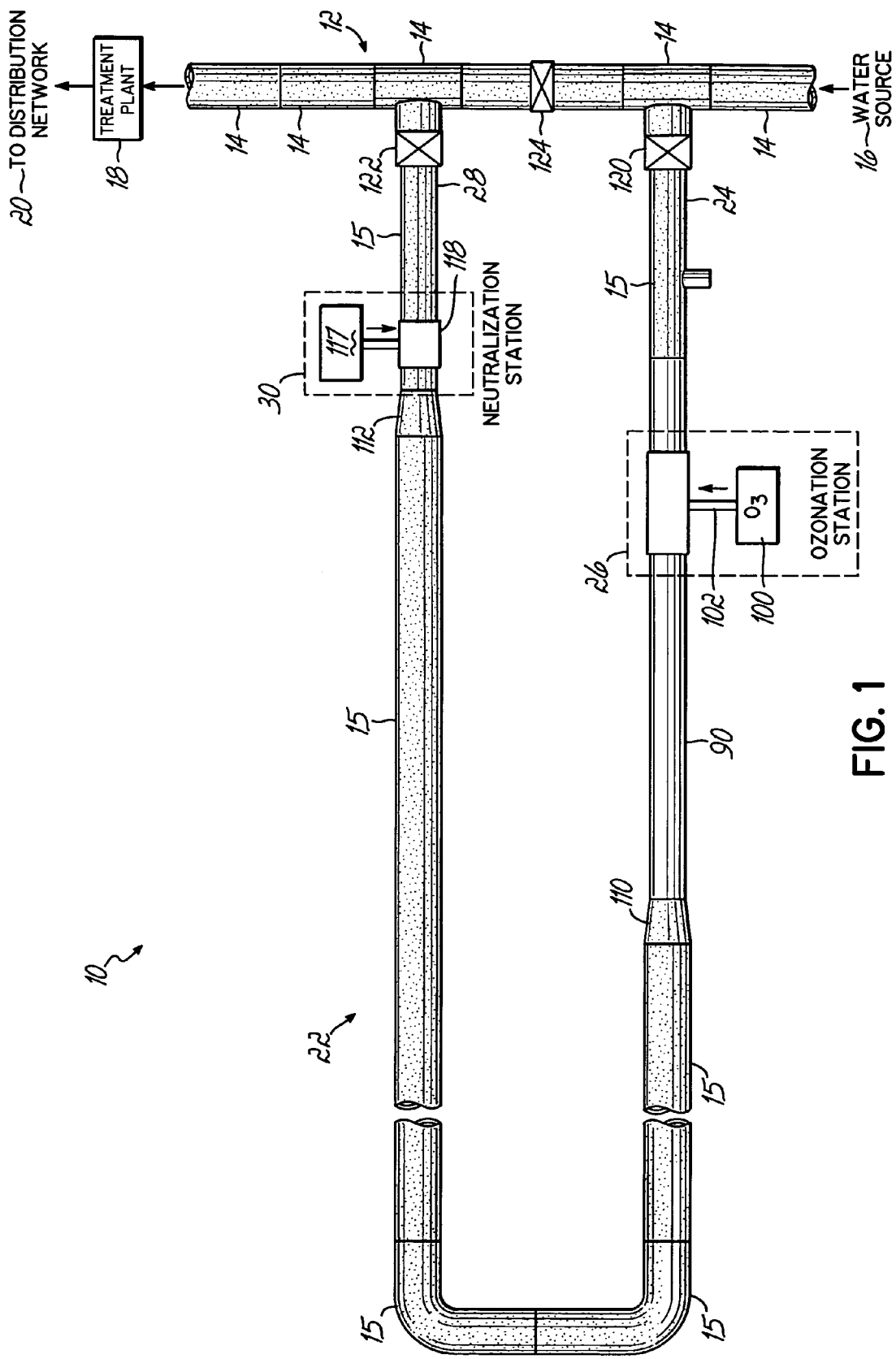
FIG. 1 is a schematic plan view illustrating an exemplary water treatment system according to one embodiment of the present invention.

Referring now to the figures, and to FIG. 1 in particular, an exemplary water treatment system 10 according to one embodiment of the present invention is shown. The water treatment system 10 includes a primary piping run 12 of conventional pressure pipe 14 from a raw water source 16, such as a lake or reservoir, to a water treatment plant 18 which provides clean water to be distributed over a distribution network 20. The treatment system 10 further includes a bypass loop 22 that may be selectively activated to divert raw water from the primary piping run 12 and into a first end 24 of the bypass loop 22 for treatment with ozone prior to delivery to the water treatment plant 18. The bypass loop 22 includes an ozonation station 26 for introducing ozone into the raw water. As the ozonated water travels along toward a second end 28 of the bypass loop 22, the ozone decomposes prior to being returned to the primary piping run 12 and delivered to the water treatment plant 18. Because the raw water is ozonated between the source 16 and the treatment plant 18, the water is in better condition for further treatment at the plant 18 and throughput can be increased. The bypass loop 22 may further include a neutralizing station 30 wherein a neutralizing agent, such as calcium thiosulfate or other chemicals, may be injected and mixed with the ozone-treated water to thereby reduce or eliminate any residual ozone remaining in the treated water.

Figure 2:
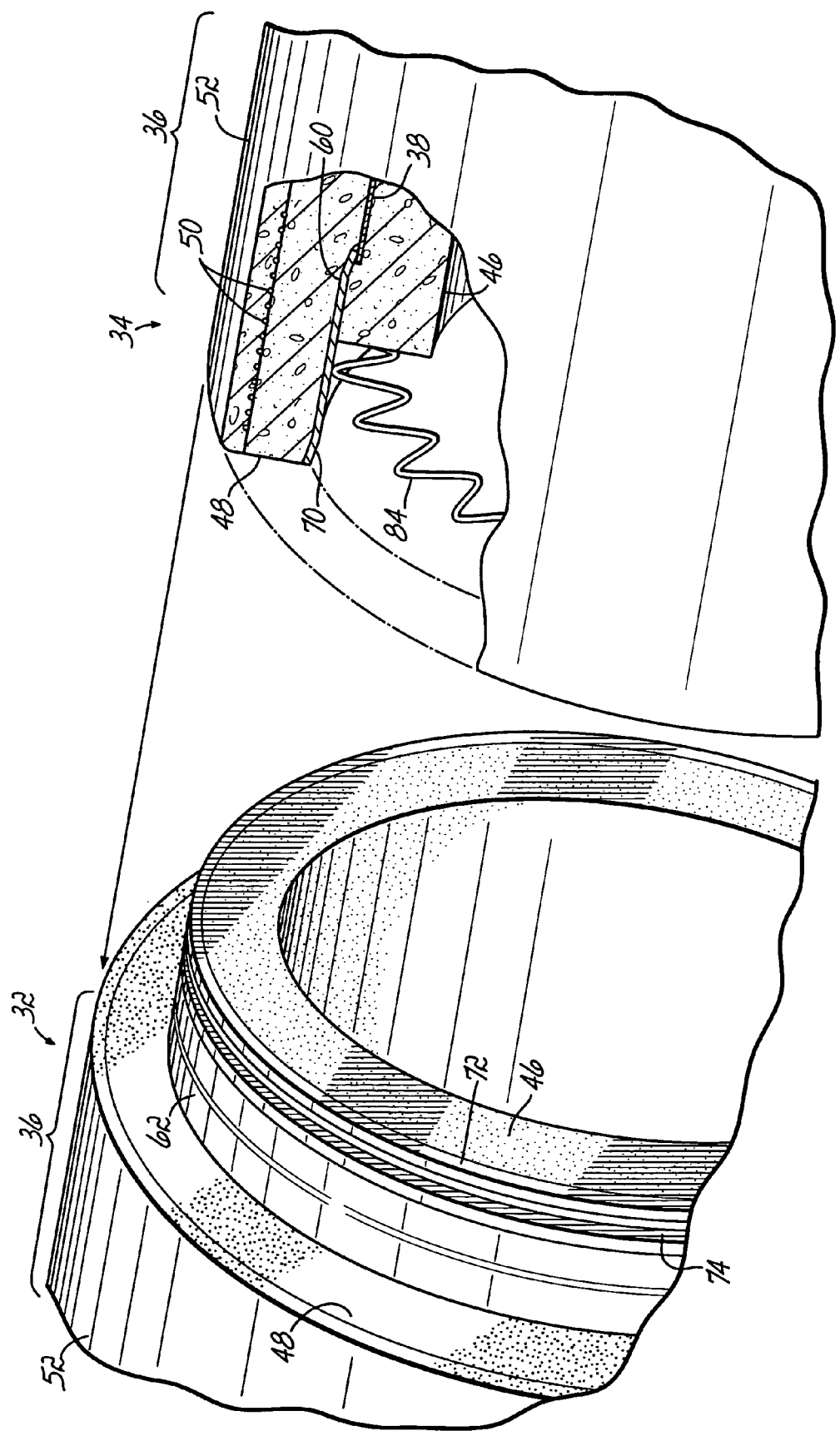
FIG. 2 is a partial perspective view illustrating a section of pressure pipe used in the water treatment system of FIG. 1, prior to assembly.
Figure 3:
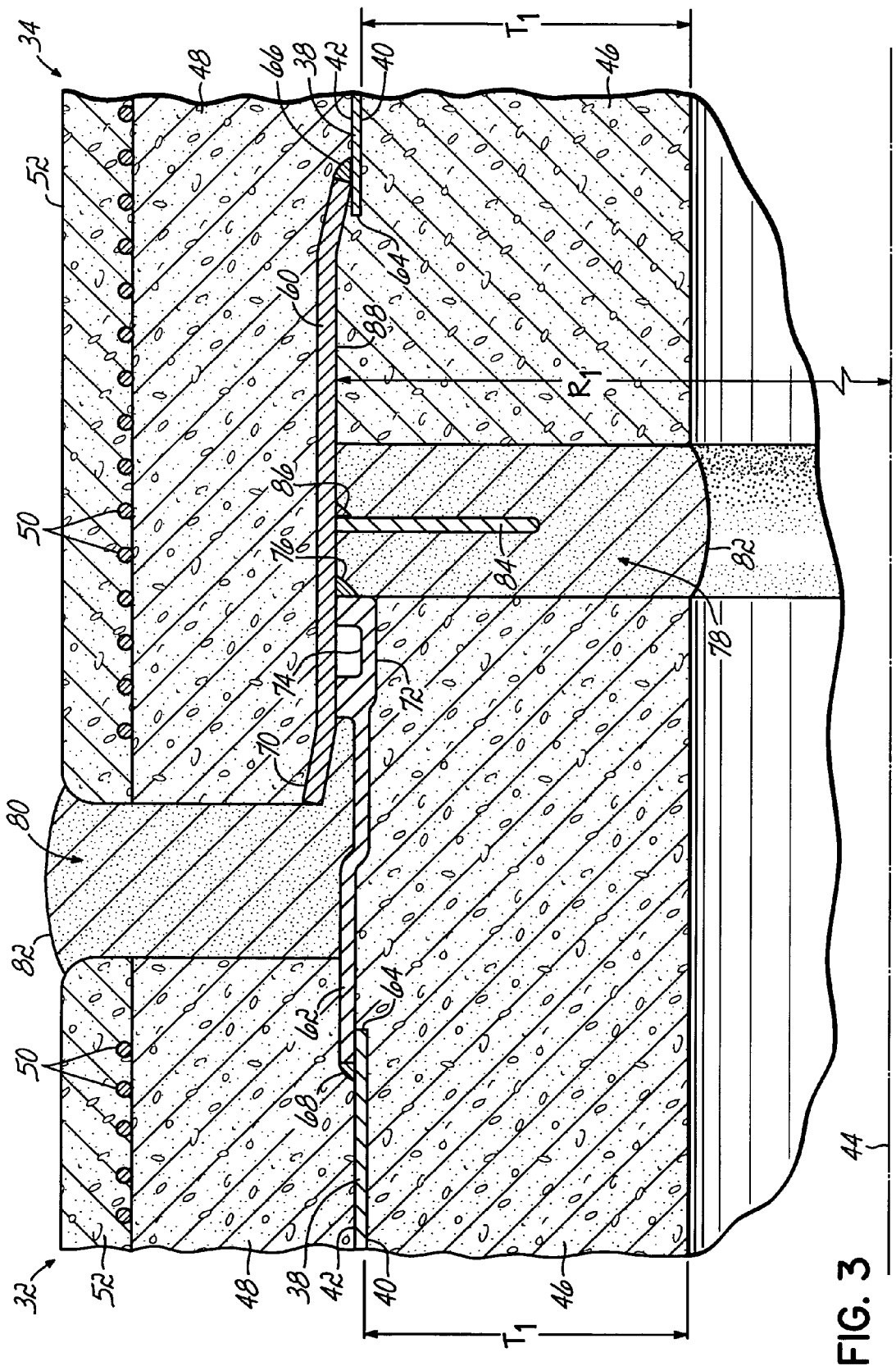
FIG. 3 is a partial cross-sectional view of the pressure pipe of FIG. 2, after assembly.

Due to the corrosive nature of ozone, the bypass loop 22 must be constructed from pressure pipe 15 that is specially constructed to resist the corrosive effects of the ozone. FIGS. 2 and 3 depict exemplary pipe members 32, 34 of a pressure pipe assembly used in the bypass loop 22. Each pipe member 32, 34 includes an intermediate portion 36 formed generally in a manner similar to that described in U.S. Pat. Nos. 3,117,019; 3,776,576; and 5,004,274. Specifically, the intermediate portion 36 includes an elongate tubular cylinder 38 formed from low-carbon steel (steel having about 0.05 to 0.25 percent carbon, by weight). The cylinder 38 has inner and outer surfaces 40, 42 and a central longitudinal axis 44. Inner and outer concrete layers 46, 48 are provided on the respective inner and outer surfaces 40, 42 of the cylinder 38 and prestressing wires 50 are wound around the cylinder 38 and/or the outer concrete layer 48 in a manner similar to that of conventional pressure pipe. In the embodiment shown, prestressing wires 50 are wound around the outer concrete layer 48, and pipe members 32, 34 further include an outer coating 52 of cement mortar over the prestressing wires 50.

The pipe members 32, 34 further include generally tubular stainless steel slip joint members 60, 62 attached to the ends 64 of their respective low-carbon steel cylinders 38 for joining adjacent pipe members 32, 34. In the embodiment shown, the stainless steel slip joint members 60, 62 are joined to the low-carbon steel cylinders 38 by welding an interface 66, 68 therebetween. The stainless steel slip joint members 60, 62 may be formed as a bell ring 60 or a spigot ring 62, as shown and described in the above-referenced patents, to facilitate joining adjacent pipe members 32, 34 in an end to end fashion. Specifically, a slip joint member in the form of a bell ring 60 includes a flared outer end 70 and an inner radius R1 sized to receive the smaller sized distal end 72 of the spigot ring 62 therein. While the spigot ring 62 is depicted with a circumferential groove 74, conventionally found on standard pressure pipe for receiving a sealing gasket, no gasket is required to seal the pipe joint of the bypass loop 22. Rather, the bell ring 60 and spigot ring 62 are joined by a substantially watertight, welded interface 76 therebetween. The welded interface 76 is formed after the spigot 62 ring has been inserted within the bell ring 60. The interior surfaces of the joined pipes 32, 34 define a passageway for transporting fluid therethrough.

In the embodiment shown, the bell ring 60 and spigot ring 62 are formed in the same general configuration as the bell rings and spigot rings shown and described in U.S. Pat. Nos. 3,117,019; 3,776,576; and 5,004,274. This commonality of configuration facilitates the manufacture and testing of pressure pipe according to this embodiment of the invention using the same manufacturing and test equipment used for conventional pressure pipe. It will be recognized however, that various other configurations of stainless steel slip joints for joining adjacent sections of pressure pipe are possible, and the invention is not limited to the exemplary embodiments shown and described herein.

After the welded interface 76 has been formed, inner and outer annular spaces 78, 80 between the first and second pipe members 32, 34 are packed with grout 82 in a manner similar to that for finishing conventional pressure pipe. To facilitate packing the inner annular spaces 78, 80 with grout 82, a reinforcing member 84 is provided on the inner surface 88 of the bell ring 60. In the embodiment shown, the reinforcing member 84 comprises a stainless steel wire that is formed with a series of bends, as best depicted in FIG. 2. The reinforcing member 84 is secured to the inner surface 88 of the bell ring 60 by welding 86 such that portions of the wire extend radially inwardly from the inner surface 88 of the bell ring 60. It will be recognized that various other reinforcing members may be provided on the interior of the bell ring 70 to facilitate packing the inner annular space 78 with grout 82.

Advantageously, the stainless steel spigot and bell rings 60, 62 resist the corrosive effects of any ozone or ozonated water which may come in contact with these components. To insure that the low-carbon steel utilized in the intermediate portions 36 of the pipe members 32, 34 is protected from ozone, the thickness T1 of the inner concrete layers 46 is controlled. It has been determined that a concrete layer thickness of approximately 3-5 inches is sufficient to protect these components from the corrosive effects of the ozone. Because the steel cylinder 38 is protected by the inner concrete layer 46, this component may be formed from low-carbon steel, thereby avoiding the considerable expense of forming the entire bypass loop 22 from stainless steel.

Figure 4:
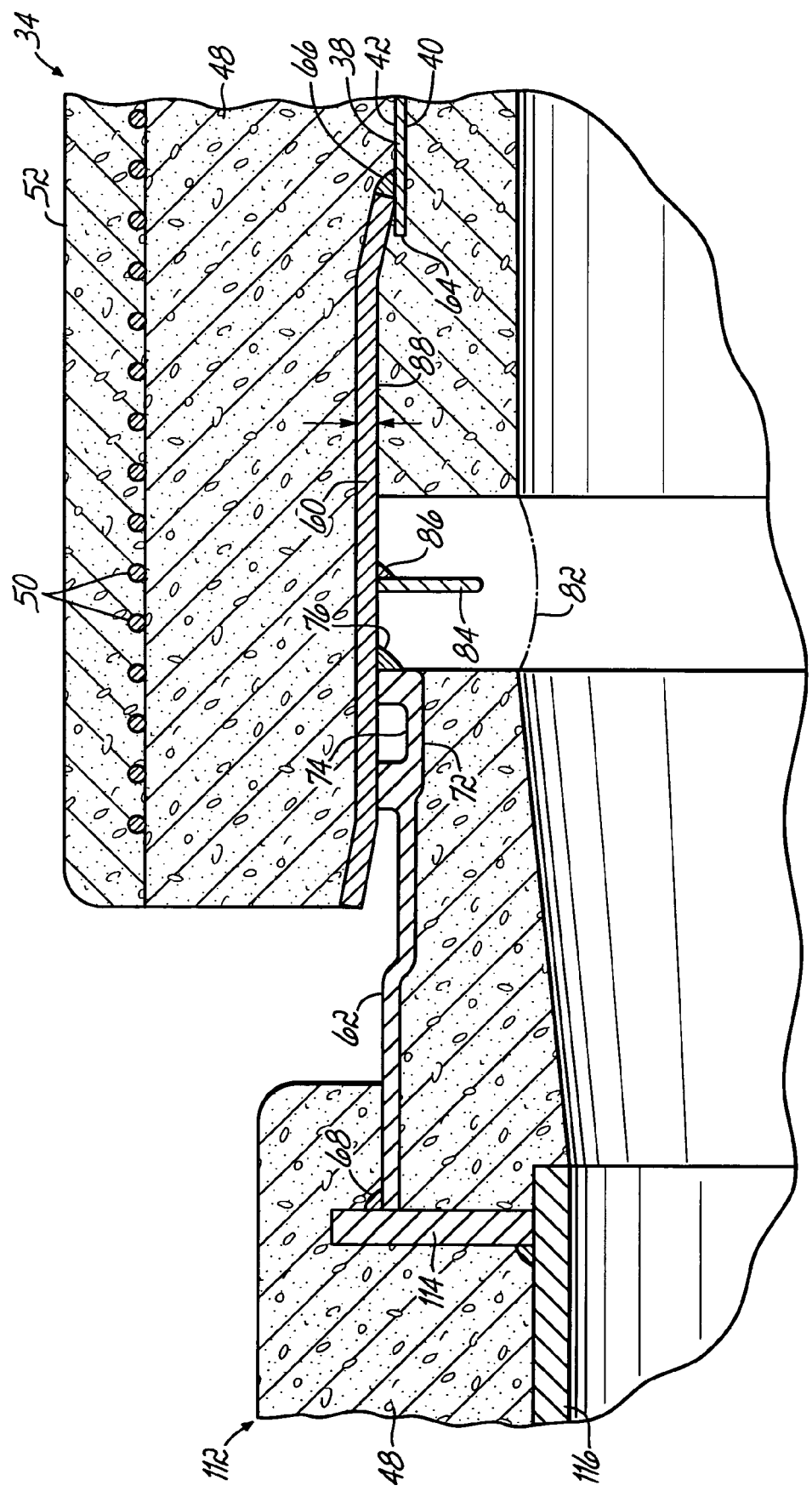
FIG. 4 is a partial cross-sectional view illustrating a pipe reducer according to one embodiment of the present invention.

Referring again to FIG. 1, the entire length of the bypass loop 22 is constructed from pressure pipe as described above. The bypass loop 22 may further include sections of stainless steel pipe 90, particularly at locations where ozone or the neutralizing agent is introduced to the water diverted through the bypass loop 22. In one embodiment, the ozonation station 26 within bypass loop 22 includes an ozone generator 100, such as those available from Ozonia North America, in Elmwood Park, N.J. The ozone generator 100 is coupled to a section of stainless steel pipe 90 in the bypass loop 22 by a conduit 102, whereby highly concentrated ozone is introduced and mixed with the diverted raw water. The ozonated water continues along the bypass loop 22 toward the second end 28. As the ozonated water is moving through the bypass loop 22, the ozone decomposes. The length of the bypass loop 22 may be selected such that the ozone has substantially decomposed by the time it reaches the second end 28, whereby the treated water may be reintroduced into the primary pipe run 12 and delivered to the treatment plant 18. The bypass loop 22 may include sections of pipe with increased inner diameters (and correspondingly increased outer diameters) to slow the flow of water through the loop and thereby provide more time for the ozone to decompose without further increasing the length of the bypass loop 22. To increase and decrease the diameter of the pipe sections in the bypass loop 22, increasers 110 or reducers 112 may be provided to join the differently sized pipe sections together. These increasers 110 or reducers 112 should be constructed with stainless steel slip joint members 60, 62, as described above, and depicted, for example, in FIG. 4. FIG. 4 depicts a reducer 112 having a stainless steel spigot ring 62 that is received within a stainless steel bell ring 60 of an adjacent pipe member 34, as described above. The reducer 112 further includes a connecting ring 114 welded between the spigot ring 62 and a reducer tube 116. Reducer tube 116 is sized to receive a corresponding spigot ring of a smaller sized pressure pipe so that the smaller sized pressure pipe may thereby be coupled to the pipe member 34. Any metal components that are exposed or not protected with at least three inches of concrete should also be formed from stainless steel.

The bypass loop 22 may further include a neutralizing station 30 near the second end 28 of the bypass loop 22 where any residual ozone remaining in the water may be further reduced or eliminated. In the embodiment shown, the neutralizing station 30 includes a manifold 117 and static mixer 118 through which chemicals for neutralizing residual ozone, such as calcium thiosulfate, may be introduced and mixed with the water. It will be recognized that various other methods for reducing or elimination of residual ozone may be utilized.

A valve 120 provided at the interface of the first end 24 of the bypass loop 22 and the primary piping run 12 may be opened and closed to selectively divert water from the primary piping run 12 through the bypass loop 22. A corresponding valve 122 provided at the second end 28 of the bypass loop 22 may be selectively opened and closed to admit treated water back into the primary piping run 12, whereafter the ozone-treated water is delivered to the water treatment plant 18 for further treatment as desired.

The bypass loop 22 discussed above may be incorporated into a new water supply installation, or it may be added to an existing installation. In both installations, a first end 24 of the bypass loop 22 is tapped into the primary piping run 12 from a water source. A valve 120 is provided at the first end of the bypass loop 22 to permit water to be selectively diverted through the bypass loop 22. A second end 28 of the bypass loop 22 is tapped back into the primary piping run 12, downstream of the first end 24, and a second valve 122 is provided to permit the ozone-treated water to be admitted back into the primary run 12. The normal path along the primary piping run 12 may be closed off by a third valve 124 provided along the primary run 12 between the first and second ends 24, 28 of the bypass loop 22. The bypass loop 22 is constructed with pressure pipe having stainless steel slip joint members 60, 62 and increased inner concrete layer 46, as described above.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

Having described the invention, what is claimed is:

1. A pressure pipe for use in transporting corrosive material, comprising:
    an intermediate pipe portion including an elongate tubular cylinder formed from low-carbon steel, said cylinder having an inner surface, an outer surface and a central longitudinal axis, said intermediate pipe portion further including an inner concrete layer disposed on said inner surface of said cylinder, and an outer concrete layer disposed on said outer surface of said cylinder; and
    at least one end portion at a distal end of the pipe, said end portion including a generally tubular stainless steel slip joint member coupled to said low-carbon steel cylinder and having a central axis substantially aligned with said central axis of said cylinder.

2. The pressure pipe of claim 1, wherein said slip joint member is a spigot ring formed from stainless steel.

3. The pressure pipe of claim 1, wherein said slip joint member is a bell ring formed from stainless steel.

4. The pressure pipe of claim 3, wherein said bell ring includes a flared outer end and an inner surface, the pressure pipe further comprising a circumferentially extending reinforcing member coupled to said inner surface of said bell ring and spaced from said flared outer end of said bell ring and from said inner concrete layer of said intermediate pipe portion.

5. The pressure pipe of claim 4, wherein said reinforcing member comprises a stainless steel wire inscribing said inner surface of said bell ring, said wire formed with a series of bends such that portions of said wire extend radially inwardly from said inner surface of said bell ring.

6. A pipe assembly, comprising:
    a first pipe member, comprising:
        an intermediate pipe portion having an elongate tubular cylinder formed from low-carbon steel, said cylinder having an inner surface, an outer surface and a central longitudinal axis, said intermediate pipe portion further including an inner concrete layer disposed on said inner surface of said cylinder, and an outer concrete layer disposed on said outer surface of said cylinder, and
        a stainless steel spigot ring coupled to said low-carbon steel cylinder and having a central axis substantially aligned with said central axis of said cylinder; and
    a second pipe member, comprising:
        an intermediate pipe portion having an elongate tubular cylinder formed from low-carbon steel, said cylinder having an inner surface, an outer surface and a central longitudinal axis, said intermediate pipe portion further including an inner concrete layer disposed on said inner surface of said cylinder, and an outer concrete layer disposed on said outer surface of said cylinder, and
        a stainless steel bell ring coupled to said low-carbon steel cylinder and having a central axis substantially aligned with said central axis of said cylinder;
    said first and second pipe members coupled together with said spigot ring inserted within said bell ring.

7. The pipe assembly of claim 6, further comprising a substantially liquid-tight welded interface between said spigot ring and said bell ring.

8. The pipe assembly of claim 6, wherein said bell ring includes a flared outer end and an inner surface, said second pipe member further comprising a circumferentially extending reinforcing member coupled to said inner surface of said bell ring and spaced from said flared outer end of said bell ring and from said inner concrete layer of said intermediate pipe portion.

9. A water treatment system, comprising:
    at least one first pipe run comprising:
        an intermediate pipe portion including an elongate tubular cylinder formed from low-carbon steel, said cylinder having an inner surface, an outer surface and a central longitudinal axis, said intermediate pipe portion further including an inner concrete layer disposed on said inner surface of said cylinder, and an outer concrete layer disposed on said outer surface of said cylinder, and at least one end portion at a distal end of the pipe, said end portion including a generally tubular stainless steel slip joint member coupled to said low-carbon steel cylinder and having a central axis substantially aligned with said central axis of said cylinder;

said intermediate pipe portion and said end portion defining a passage therethrough for transporting a fluid material;

an ozone source operatively coupled to said first pipe run for communication with said passage through said intermediate pipe portion and said end portion.

10. The water treatment system of claim 9, further comprising an elongate, stainless steel pipe operatively coupled to said first pipe run, said ozone source coupled to said stainless steel pipe.

11. The water treatment system of claim 9, further comprising an injection manifold operatively coupled to said first pipe run for injecting an ozone neutralizing agent into said passage.

12. The water treatment system of claim 9, further comprising:

a second pipe run operatively coupled to said first pipe run for fluid communication with said passage, said second pipe run comprising:

an intermediate pipe portion including an elongate tubular cylinder formed from low-carbon steel, said cylinder having an inner surface, an outer surface and a central longitudinal axis, said intermediate pipe portion further including an inner concrete layer disposed on said inner surface of said cylinder, and an outer concrete layer disposed on said outer surface of said cylinder, and at least one end portion at a distal end of the pipe, said end portion including a generally tubular low-carbon steel slip joint member coupled to said low-carbon steel cylinder and having a central axis substantially aligned with said central axis of said cylinder; and at least one valve disposed between said first and second pipe runs and operable to selectively divert fluid passing through said second pipe run through said first pipe run.

13. The water treatment system of claim 12, wherein said second pipe run is coupled to a source of raw water.

14. The water treatment system of claim 12, wherein said first pipe run has first and second ends, each operatively coupled to said second pipe run, such that fluid diverted through said first pipe run is returned to said second pipe run after passing through said first pipe run.

* * * * *